Patented Oct. 17, 1933

1,930,753

UNITED STATES PATENT OFFICE 1,930,753

CHLORINATION OF CRESIDINE

Emeric Havas and Henry R. Lee, South Milwaukee, Wis., assignors to E. I. du Pont de Nemours & Company, Wilmington, Del., a corporation of Delaware No Drawing. Application January 25, 1932
Serial No. 588,819

11 Claims. (Cl. 260—130.5)

This invention relates to a process of chlorinating cresidine (1-methoxy-2-amino-4-methyl-benzene) to produce 5-chloro-2-amino-4-methyl-anisol.

It is an object of this invention to devise a simple, economical and efficient method for obtaining 5-chloro-2-amino-4-methyl-anisol in a high state of purity.

Other and further important objects of this invention will become apparent from the following description and appended claims.

Although 5-chloro-2-amino-4-methyl-1-anisol constitutes a valuable intermediate for dyestuffs, no method for its direct preparation appears in the literature. This compound has apparently heretofore been obtained merely as a by-product in the reduction of 2-nitro-4-methyl-anisol by the aid of tin and hydrochloric acid (Beilstein, 4th Ed., vol. XIII, page 605).

We have now found that this valuable intermediate may be prepared directly by chloronating an N-acidyl derivative of cresidine. For best results we combine our novel discovery with the invention set forth in our copending application Ser. No. 531,644, thereby accomplishing the desired result with a maximum degree of efficiency and economy. In other words, we found that for best results the formylamino derivative of cresidine should be prepared and used as initial material for our process, in preference to any other acidlyamino derivatives of cresidine.

In our copending application Ser. No. 531,644, of which this is a continuation in part, it has been shown that if o-toluidine is converted into its N-formyl derivative, the latter may be used as initial material in a novel process of preparing 5-chloro-2-amino-1-toluene which process is characterized by unusual simplicity of procedure, economy of materials, and general over-all efficiency. The dominant characteristic of said process consists of carrying out the chlorination of the formylamino body and subsequent hydrolysis of the formyl group in an organic medium immiscible with water, such as toluene.

We have now found that said process is applicable with equal advantage to the manufacture of 5-chloro-2-amino-4-methyl-anisol.

Based on this discovery, therefore, our preferred process consists of reacting cresidine with formic acid, whereby to obtain 2-formylamino-4-methyl-anisol; dissolving the latter in an inert organic solvent which is immiscible with water, for instance, toluene; partially evaporating to remove residual moisture; treating the mass with a chlorinating agent such as gaseous chlorine to form 5-chloro-2-formylamino-4-methyl-1-anisol; adding an aqueous hydrochloric acid solution and heating to hydrolyze off the formyl group; and recovering the precipitated hydrochloride of 5-chloro-2-amino-4-methyl-anisol.

Without limiting our invention to any particular procedure, the following example is given to illustrate our preferred method of operation. Parts mentioned are parts by weight.

*Example*

274 parts of cresidine (1-methoxy-2-amino-4-toluene) and 120 parts of 90% formic acid are heated together at about 100–103° C. for about 3 hours. The mass is then cooled to about 70° C. and 500 parts of toluene are added. The mass is now heated to distill off the excess of formic acid as well as any water that is present and then cooled to about 60° C. Additional toluene is now introduced into the mass to bring the total quantity of toluene to about 1800 parts. The toluene-diluted mass is cooled to about 20° C. and chlorine gas is passed into the mixture at 20° C. until 142 parts have been consumed. 50 parts of water are now added and 170 parts of an aqueous hydrochloric acid solution (20° Bé.) are introduced. The mass is heated at about 60–65° C. for about 2 hours, cooled to 20° C. and filtered. The filter cake constitutes the hydrochloride of 5-chloro-2-amino-1-methoxy-4-toluene in high yield and of sufficient purity to be applicable directly for technical purposes.

The filtrate consists of two phases: (1) An aqueous phase containing dissolved therein the excess hydrochloric acid and the hydrochloride of any isomeric chloro-cresidines formed, and (2) an oily phase from which the toluene may be recovered in pure form by steam distillation.

It will thus be seen that our novel process is exceedingly simple in operation, reduces the handling of materials to a minimum, saves hydrochloric acid, employs a comparatively cheap acidylating agent, uses an inexpensive solvent for the reaction, and enables the recovery of the same without waste and at very little cost.

Also, the separation of 5-chloro-2-amino-4-methyl-anisol from any isomers that may be formed during the reaction is substantially complete, and the product is obtained in practically pure state, and in high yield.

If desired, the various intermediate products formed in the reaction may be isolated. The treatment of cresidine with formic acid in the first step of the above process results in 2-formyl-amino-4-methyl-1-anisol. The chlorination of this product according to the above process yields 5-chloro-2-formylamino-4-methyl-anisol and some isomeric derivatives. These chlorinated compounds may be isolated by neutralizing the reaction mass, and distilling off the toluene. The 5-chloro-compound may be separated from its isomers by recrystallizing from toluene. It is a white crystalline substance, melting at 91° C. When a toluene solution thereof is treated with aqueous hydrochloric acid solution, the formyl group splits off, and the resulting amino group is converted into the HCl salt, which is insoluble in toluene, and therefore either dissolves in the aqueous phase or precipitates.

It will be understood that many variations and modifications are possible in the specific procedure disclosed, without departing from the spirit of this invention.

Thus, instead of chlorine gas, other chlorinating agents which are adapted for use in anhydrous media may be used; for instance, sulfuryl chloride. Instead of toluene, any other organic solvent may be used, provided it is a good solvent for formylcresidine, immiscible with water, and not readily chlorinated at low temperatures in the absence of a catalyst. Benzenoid solvents such as, for instance, benzene and chloro-benzene are specific examples of solvents that may be used in place of toluene.

Many other variations and modifications are possible in our procedure without departing from the spirit of this invention.

We claim:

1. The process of preparing a 5-chloro-2-amino-4-methyl-1-anisol compound which comprises chlorinating a cresidine in which the amino group is protected by an organic acidyl group.

2. In the process of manufacturing a chlorinated cresidine compound, the step which comprises chlorinating 2-formylamino-4-methyl-anisol.

3. In the process of manufacturing 5-chloro-2-amino-4-methyl-1-anisol, the steps comprising chlorinating 2-formylamino-4-methyl-anisol and hydrolizing the product to eliminate the formyl group.

4. As a new product, 5-chloro-2-formylamino-4-methyl-1-anisol.

5. In the process of chlorinating cresidine, the steps comprising reacting cresidine with formic acid, chlorinating the reaction product formed and hyrdolyzing the resulting chlorinated product to eliminate the formyl group.

6. In the process of manufacturing chlorinated cresidine, the step which comprises effecting the chlorination of N-formyl cresidine in an organic liquid medium which is immiscible in water.

7. In the process of manufacturing chlorinated cresidine, the step which comprises reacting with a chlorinating agent, 2-formylamino-4-methyl-anisol dissolved in a benzenoid solvent.

8. In the process of manufacturing chlorinated cresidine, the step which comprises effecting the chlorination of 2-formylamino-4-methyl-anisol in a medium of toluene.

9. In the process of preparing chlorinated cresidine, the step which comprises passing chlorine gas into a solution of N-formyl-cresidine in toluene.

10. A process of preparing a 5-chloro-2-amino-4-methyl-anisol compound, which comprises passing chlorine gas into a solution of N-formyl-cresidine in toluene, adding an aqueous hydrochloric acid solution, warming the mass to effect hydrolysis of the formyl group, and recovering the precipitated hydrochloride of 5-chloro-2-amino-4-methyl-anisol.

11. The process of preparing a 5-chloro-2-amino-4-methyl-anisol compound which comprises reacting upon cresidine with formic acid to produce N-formyl-cresidine, dissolving the latter in toluene, heating the mixture to eliminate excess formic acid and water, passing chlorine gas into the toluene solution of the N-formyl-cresidine, adding an aqueous hydrochloric acid solution, warming the mass to effect hydrolysis of the formyl group, and filtering to isolate the hydrochloride of 5-chloro-2-amino-4-methyl-anisol.

EMERIC HAVAS.
HENRY R. LEE.